United States Patent
Lu et al.

(10) Patent No.: US 9,116,005 B2
(45) Date of Patent: Aug. 25, 2015

(54) ELECTRONIC SYSTEMS FOR LOCATING OBJECTS

(75) Inventors: Shenghong Lu, Chengdu (CN); James Wang, San Jose, CA (US); Jun Chen, Chengdu (CN)

(73) Assignee: Maishi Electronic (Shanghai) Ltd, Shanghai (CN)

(*) Notice: Subject to any disclaimer, the term of this patent is extended or adjusted under 35 U.S.C. 154(b) by 778 days.

(21) Appl. No.: 13/030,948

(22) Filed: Feb. 18, 2011

(65) Prior Publication Data

US 2011/0137558 A1   Jun. 9, 2011

Related U.S. Application Data

(63) Continuation-in-part of application No. 12/495,454, filed on Jun. 30, 2009.

(30) Foreign Application Priority Data

Jan. 27, 2011   (CN) .......................... 2011 1 0034870

(51) Int. Cl.
G01C 21/30   (2006.01)

(52) U.S. Cl.
CPC ..................................... G01C 21/30 (2013.01)

(58) Field of Classification Search
CPC ........................................................ G01C 21/30
USPC ........................................................ 701/208
See application file for complete search history.

(56) References Cited

U.S. PATENT DOCUMENTS

| | | | |
|---|---|---|---|
| 4,796,191 A * | 1/1989 | Honey et al. | 701/445 |
| 5,469,360 A | 11/1995 | Ihara et al. | |
| 5,523,765 A | 6/1996 | Ichikawa | |
| 5,528,518 A | 6/1996 | Bradshaw et al. | |
| 5,839,087 A | 11/1998 | Sato | |
| 5,899,954 A | 5/1999 | Sato | |
| 5,906,653 A | 5/1999 | Ichimura | |
| 6,333,702 B1 | 12/2001 | Hiyokawa et al. | |
| 6,502,033 B1 | 12/2002 | Phuyal | |
| 6,658,353 B2 | 12/2003 | Shimizu et al. | |
| 6,915,205 B2 | 7/2005 | Kim et al. | |

(Continued)

FOREIGN PATENT DOCUMENTS

| | | |
|---|---|---|
| CN | 1530635 A | 9/2004 |
| CN | 1837754 A | 9/2006 |

(Continued)

OTHER PUBLICATIONS

Zhu Hong, Guan Guixia, Wang Zhu, Guan Yong, "Map-Matching Estimation for GPS Navigation System in Urban District," Microcomputer Information, Mar. 5, 2008, vol. 24 Issue 3-1, pp. 143-144, China.

(Continued)

*Primary Examiner* — John Q Nguyen
*Assistant Examiner* — Jordan S Fei (57) ABSTRACT

A database for a set of orientation-matched road (OMR) sections is searched according to a calculated orientation of an object and orientations of road sections stored in the database. The OMR sections are searched for a position-matched road (PMR) set according to a calculated position of the object and positions of the OMR sections. The PMR set includes one or more PMR sections. The object is located using the PMR set.

22 Claims, 6 Drawing Sheets

(56) References Cited

U.S. PATENT DOCUMENTS

| | | | |
|---|---|---|---|
| 8,082,094 | B2 | 12/2011 | Gao |
| 2010/0217522 | A1 | 8/2010 | Ando et al. |

FOREIGN PATENT DOCUMENTS

| | | | |
|---|---|---|---|
| CN | 1888824 | A | 1/2007 |
| CN | 101017098 | A | 8/2007 |
| CN | 101545788 | A | 9/2009 |
| CN | 101819043 | A | 9/2010 |
| EP | 0716289 | A1 | 6/1996 |
| EP | 0738877 | A2 | 10/1996 |
| EP | 0747668 | A2 | 12/1996 |
| EP | 1176396 | A2 | 1/2002 |
| JP | 08292044 | A | 11/1996 |
| JP | 8334354 | A | 12/1996 |
| JP | 8334365 | A | 12/1996 |
| JP | 9229698 | A | 9/1997 |
| JP | 2008180551 | A | 8/2008 |
| TW | 200900655 | A | 1/2009 |

OTHER PUBLICATIONS

Zhang Zhen-Hui, Cui Tie-Jun, "Research of Map-matching Algorithm in Vehicle Navigation System," Geomatics World, Apr. 25, 2007, Issue 2, pp. 55-59, China.

Xu Zhi-Hai, Zhang Zhao-Yun, Chen Ying-Dong, "Technique of Positioning Data Preceding and Map Matching in Navigation System for Vehicle," Journal of Institute of Surveying and Mapping, Dec. 30, 2003, vol. 20 Issue 4, pp. 247-250, China.

Ma Hai-Bo,Li Shao-Jie,Huang Yue-Feng,Teng Shou-Wei, "Accurate Location Algorithms in Vehicle Navigation System," Geomatics World, Feb. 27, 2010, Issue 1, pp. 48-55, China.

Japanese Decision of Rejection dated Jul. 3, 2012 corresponding to Japanese Serial No. 2010-18783 (2 pages).

Extended European search report received in European patent application No. 10151407.3 dated Jan. 2, 2014 (8 pages).

\* cited by examiner

ELECTRONIC SYSTEMS FOR LOCATING OBJECTS

RELATED APPLICATION

The present application is a continuation-in-part of U.S. patent application Ser. No. 12/495,454, filed Jun. 30, 2009, titled "An Inertial Navigation System with Error Correction Based on Navigation Map", which is hereby incorporated by reference in its entirety. The present application claims priority to Patent Application No. 201110034870.7, filed on Jan. 27, 2011, with the State Intellectual Property Office of the People's Republic of China.

BACKGROUND

A conventional inertial navigation system includes a dead reckoning (DR) system for calculating a position and an orientation of a moving object according to motion tracking information. The DR system can obtain the motion tracking information from a motion sensor such as a gyroscope and a milemeter. However, the gyroscope and the milemeter can introduce errors that reduce the accuracy of the calculated position and orientation of the moving object.

SUMMARY

In one embodiment, a database for a set of orientation-matched road (OMR) sections is searched according to a calculated orientation of an object and orientations of road sections stored in the database. The OMR sections are searched for a position-matched road (PMR) set according to a calculated position of the object and positions of the OMR sections. The PMR set includes one or more PMR sections. The object is located using the PMR set.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "searching," "locating," "comparing," "increasing," "selecting," "correcting," "setting" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data and includes any information delivery media. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a positioning system for locating a moving object. The positioning system calculates a position of the moving object and an orientation of the moving object, and compares the calculated position and orientation with information about road sections on an electronic map. The positioning system further selects a matched reference road section from the road sections on the electronic map, and corrects the calculated position and the calculated orientation based on the matched reference road section.

Figure 1:
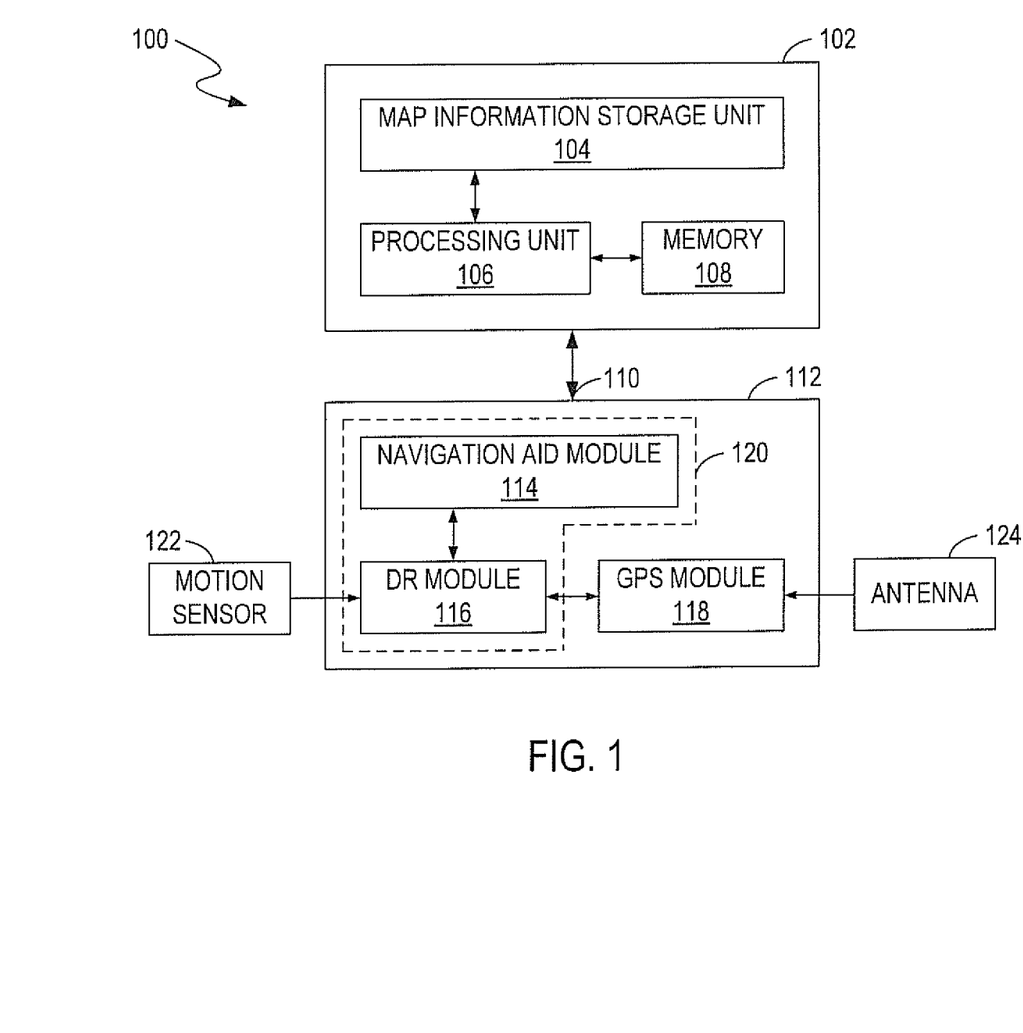
FIG. 1 illustrates a block diagram of an example of a positioning system, in accordance with one embodiment of the present invention.

FIG. 1 illustrates a block diagram of an example of a positioning system 100, e.g., an inertial navigation system/global positioning system (INS/GPS), in accordance with one embodiment of the present invention. The positioning system 100 includes a map system 102 and a position calculation system 112. The position calculation system 112 can calculate a position of a moving object (not shown), e.g., a vehicle. The position calculation system 112 can receive GPS signals from satellites (not shown) and calculate a current position of the moving object according to the GPS signals. If the GPS signals are too weak to be received, the position calculation system 112 can also calculate a current position of the moving object according to an initial position of the moving object and a motion track of the moving object. Furthermore, the position calculation system 112 can correct the calculated position of the moving object according to reference information from the map system 102. In one embodiment, the map system 102 stores a navigation map that includes information about road sections. For example, a navigation map includes multiple roads, and each road is divided into several sections. Each section of the road, e.g., referred to as road section, has an orientation and a position. The map system 102 can store the orientation and position information of road sections on the navigation map. The map system 102 can receive the calculated or corrected position information of the moving object from the position calculation system 112 and display the position of the moving object on the navigation map. The map system 102 can further search the navigation map for reference information, and provide the reference information to the position calculation system 112.

More specifically, in one embodiment, the map system 102 includes a map information storage unit 104, a processing unit 106, and memory 108. The map information storage unit 104 stores a database that includes information for a navigation map, e.g., position information and orientation information about road sections. The memory 108 stores computer-executable software, e.g., computer-readable instructions. The processing unit 106 executes the computer-executable software, e.g., the computer-readable instructions, such that the processing unit 106 searches the map information database for a set of orientation-matched road (OMR) sections according to a calculated orientation $O_{CAL}$ of the moving object and orientations $O_{RS}$ of road sections stored in the map information database. The processing unit 106 also executes the computer-executable software, e.g., the computer-readable instructions, such that the processing unit 106 searches the OMR sections for a position-matched road (PMR) set according to a calculated position $P_{CAL}$ of the moving object and positions $P_{RS}$ of the OMR sections. The PMR set includes one or more PMR sections and is used to locate the moving object.

In one embodiment, the processing unit 106 searches for the OMR sections by comparing a difference $\theta_{DIF}$ between the calculated orientation $O_{CAL}$ of the moving object and the orientation $O_{RS}$ of each road section stored in the map information database with an orientation offset reference $\theta_{REF}$. If the difference $\theta_{DIF}$ between the calculated orientation $O_{CAL}$ and an orientation $O_{RS}$ of a road section is less than the orientation offset reference $\theta_{REF}$, e.g. $|O_{CAL}-O_{RS}|<\theta_{REF}$, then that road section is an OMR section. The processing unit 106 also searches for one or more PMR sections by comparing a distance reference $D_{REF}$ with a distance $D_{CRS}$ from the calculated position $P_{CAL}$ of the moving object to each of the OMR sections. If the distance $D_{CRS}$ from the calculated position $P_{CAL}$ to an OMR section is less than the distance reference $D_{REF}$, then that OMR section is a PMR section.

In one embodiment, on one hand, if the result of the search for one or more PMR sections is a failure, e.g., no PMR section is found, then the processing unit 106 increases the distance reference $D_{REF}$ to another value $D'_{REF}$. The processing unit 106 re-searches the OMR sections for one or more PMR sections by comparing the distance reference $D'_{REF}$ with the distance $D_{CRS}$ from the calculated position $P_{CAL}$ of the moving object to each of the OMR sections. By way of example, the distance reference $D_{REF}$ can be initially set to 10 m. If the processing unit 106 cannot find any PMR section within 10 m, the processing unit 106 increases the distance reference $D_{REF}$ to 30 m, or 50 m, or 70 m, etc., and repeats the comparison until one or more PMR sections are found. In one embodiment, the distance reference $D_{REF}$ has a limit, e.g., 70 m. If the processing unit 106 cannot find any PMR section within that limit, then the processing unit 106 can terminate the search. On the other hand, if one or more PMR sections are found, then the map system 102 provides information for the one or more PMR sections to the position calculation system 112.

In one embodiment, the position calculation system 112 includes a GPS module 118 and a processor 120 that includes a navigation aid module 114 and a dead reckoning (DR) module 116. The GPS module 118 can calculate the position of the moving object according to GPS signals if the GPS signals are strong enough. The DR module 116 can calculate the position of the moving object according to the initial position of the moving object and a motion track of the moving object if the GPS signals are not strong enough. The navigation aid module 114 can correct the position of the moving object that is calculated by the DR module 116.

By way of example, the GPS module 118 can receive GPS signals via an antenna 124 and calculate a position of the moving object according to the GPS signals. The GPS module 118 can provide the position information of the moving object to the map system 102 to display the position of the moving object on the navigation map. The GPS module 118 can also provide the position information for the moving object to the processor 120. The DR module 116 in the processor 120 can calculate a position $P_{CAL}$ of the moving object according to initial position information for the moving object, e.g. the position information provided by the GPS module 118 or position information pre-stored in the DR module 116, and according to the motion track of the moving object. The motion track includes the change in the orientation of the moving object and includes the running distance of the moving object. The motion track of the moving object can be sensed by a motion sensor 122, e.g., a gyroscope, a milemeter, etc. The DR module 116 can also calculate an orientation $O_{CAL}$ of movement of the moving object according to the motion track. An interface 110 coupled to the processor 120 can receive reference information from the map system 102 periodically, and can transfer the reference information to the processor 120. The reference information indicates a reference orientation $O_{REF}$ and a reference position $P_{REF}$ of a reference road section, shown on the navigation map, where the moving object is located. The processor 120 can further compare the calculated position $P_{CAL}$ and the calculated orientation $O_{CAL}$ with the reference orientation $O_{REF}$ and the reference position $P_{REF}$, respectively. If the calculated position $P_{CAL}$ is mismatched with the reference position $P_{REF}$, e.g., a distance from the calculated position $P_{CAL}$ to the reference position $P_{REF}$ is greater than a predetermined threshold, or if the calculated orientation $O_{CAL}$ is mismatched with the reference orientation $O_{REF}$, e.g., a difference between the calculated orientation $O_{CAL}$ and the reference orientation $O_{REF}$ is greater than a predetermined threshold, then the processor 120 can request the map system 102 for the aforementioned one or more PMR sections.

Advantageously, the processor 120 can receive information indicative of the one or more PMR sections via the interface 110 and use that information to correct the calculated orientation $O_{CAL}$ and the calculated position $P_{CAL}$.

Figure 2:
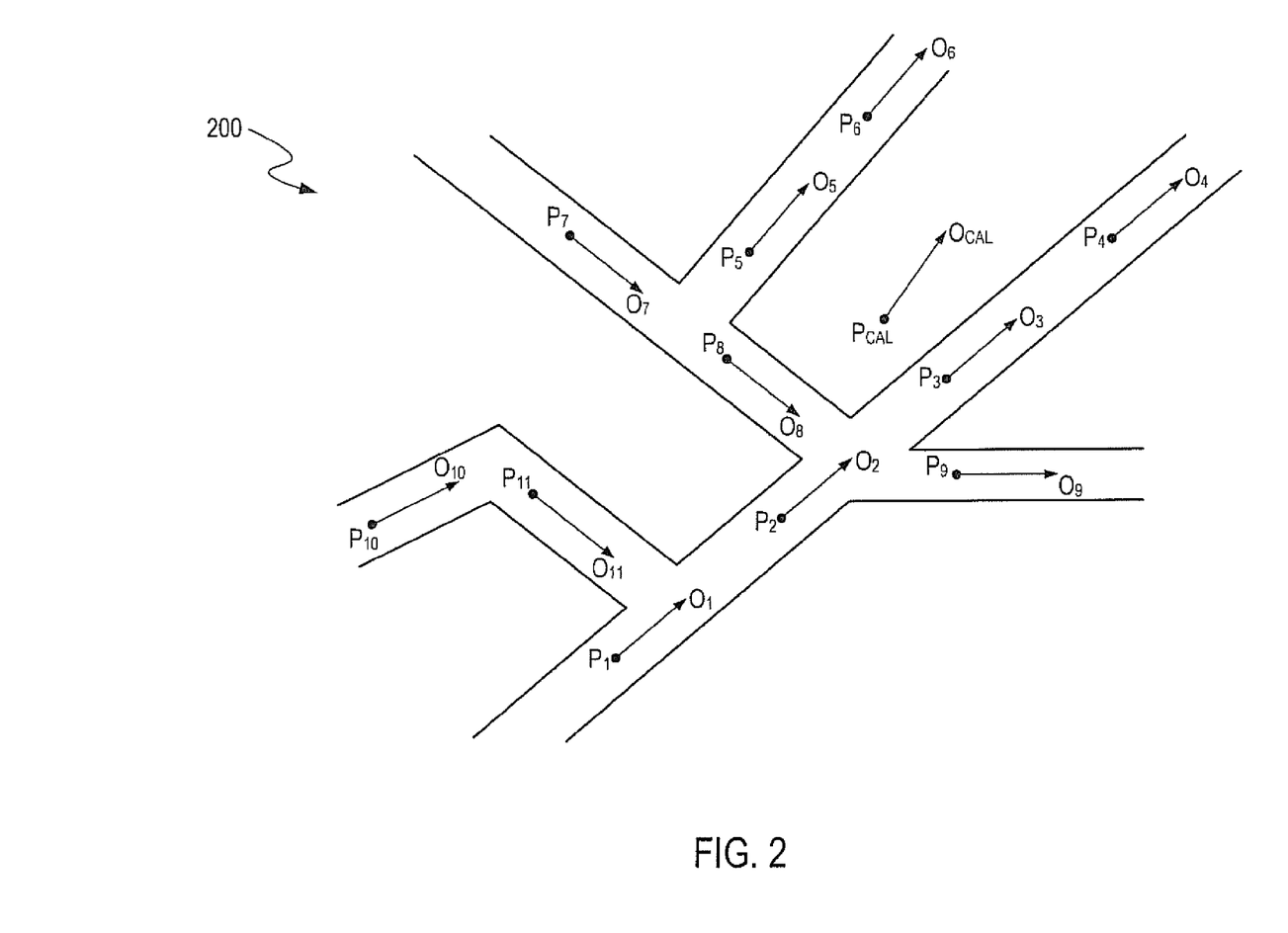
FIG. 2 illustrates a diagram of part of an example of a map, in accordance with one embodiment of the present invention.

FIG. 2 illustrates a diagram of part of an example of a map 200, in accordance with one embodiment of the present invention. FIG. 2 is described in combination with FIG. 1. As show in FIG. 2, the map 200 includes multiple road sections. Each road section includes a position $P_1, P_2, \ldots$ (shown as a dot) and an orientation $O_1, O_2, \ldots$ (shown as an arrow). The road section that includes a position $P_K$ and an orientation $O_K$ is referred to as road section $(P_K, O_K)$ (K=1, 2, ...). Additionally, $P_{CAL}$ represents a position of the moving object calculated by the DR module 116, and $O_{CAL}$ represents an orientation of the moving object calculated by the DR module 116.

In one embodiment, the processor 120 generates a request to search the map system 102. The request includes an orientation $O_{CAL}$ and a position $P_{CAL}$ calculated by the DR module 116. The processing unit 106, in response to the request, searches the map 200 for a first set of OMR sections by comparing a difference between the calculated orientation $O_{CAL}$ and each orientation $O_1, O_2, \ldots$ with an orientation offset reference $\theta_{REF}$, e.g., 60°. In the example of FIG. 2, the differences between the calculated orientation $O_{CAL}$ and the orientations $O_1, O_2, O_3, O_4, O_5, O_6, O_9$ and $O_{10}$ are less than 60°, therefore the first set of OMR sections include road sections $(P_1, O_1), (P_2, O_2), (P_3, O_3), (P_4, O_4), (P_5, O_5), (P_6, O_6), (P_9, O_9)$ and $(P_{10}, O_{10})$.

The processing unit 106 further searches for one or more PMR sections by comparing a distance from the calculated position $P_{CAL}$ to each member of the first set of OMR sections with a distance reference $D_{REF}$. The distance reference $D_{REF}$ can be initially set to 10 m, for example.

If the distances from the calculated position $P_{CAL}$ to all the positions $P_1, P_2, \ldots$ are greater than $D_{REF}$, then no PMR section is found and the current search for the one or more PMR sections fails. The processing unit 106 can then increase the distance reference $D_{REF}$ to 30 m, for example. The processing unit 106 searches the first set of OMR sections for one or more PMR sections within 30 m. If one or more PMR sections are found, the map system 102 provides information for the one or more PMR sections to the position calculation system 112; otherwise, the processing unit 106 increases the distance reference $D_{REF}$ again, e.g., to 50 m. The processing unit 106 can increase the distance reference $D_{REF}$ step by step until one or more PMR sections are found. However, the distance reference $D_{REF}$ has a maximum limit, e.g., 70 m. If no PMR section is found within the maximum limit, then the processing unit 106 terminates the search and may generate an output signal indicating failure.

In one embodiment, when one or more PMR sections are found, the map system 102 provides information for the PMR sections to the position calculation system 112. The processor 120 selects a matched reference road (MRR) section from the PMR sections according to a distance from the calculated position $P_{CAL}$ of the moving object to each member of the PMR sections and the total number of PMR sections.

For example, the distance from the calculated position $P_{CAL}$ to the position $P_3$ may be less than the distance reference $D_{REF}$, while the distances from the calculated position $P_{CAL}$ to the other positions $P_1, P_2, P_4, P_5, P_6, P_9$ and $P_{10}$ may be greater than the distance reference $D_{REF}$. Accordingly, only one PMR section, e.g., the road section $(P_3, O_3)$, is found. The navigation aid module 114 can use the road section $(P_3, O_3)$ as an MRR section, and correct the calculated position $P_{CAL}$ and the calculated orientation $O_{CAL}$ to the position $P_3$ and the orientation $O_3$, respectively. In one embodiment, the DR module 116 includes a register unit to store currently calculated information, e.g., position and orientation information, of the moving object. The navigation aid module 114 can erase the currently calculated information in the register unit and write the information indicative of the position $P_3$ and the orientation $O_3$ into the register unit.

For another example, the distances from the calculated position $P_{CAL}$ to the positions $P_3$ and $P_5$ may be less than the distance reference $D_{REF}$, while the distances from the calculated position $P_{CAL}$ to the other positions $P_1, P_2, P_4, P_6, P_9$ and $P_{10}$ may be greater than the distance reference $D_{REF}$. Accordingly, two PMR sections, e.g., the road sections $(P_3, O_3)$ and $(P_5, O_5)$, are found. The processor 120 can compare the distance $|P_3 - P_{CAL}|$ with the distance $|P_5 - P_{CAL}|$. The navigation aid module 114 selects the road section that has the shorter distance from the calculated position $P_{CAL}$ as an MRR section, e.g., the road section $(P_3, O_3)$, and corrects the calculated position $P_{CAL}$ and the calculated orientation $O_{CAL}$ according to the selected MRR section.

In yet another example, the number of PMR sections may be greater than two. For example, there can be a highway bridge (not shown) above or beneath the road section $(P_3, O_3)$ and having an orientation near the orientation $O_3$. The processor 120 can discard the currently received information for the PMR sections. The processor 120 can generate a new search request when a predefined time interval expires or when a running distance of the moving object exceeds a preset reference. The new request includes a newly calculated orientation $O'_{CAL}$ and a newly calculated position $P'_{CAL}$ of the moving object. The processing unit 106 receives the new request and searches the database, e.g., the map 200, in the map information storage unit 104 for a second set of OMR sections based on the newly calculated orientation $O'_{CAL}$. The processing unit 106 further searches the second set of OMR sections for one or more PMR sections based on the newly calculated position $P'_{CAL}$. The processing unit 106 performs the search steps in a similar manner as described above. Advantageously, the positioning system 100 can reduce mistakes such as correcting the calculated position and the calculated orientation of the moving object using the wrong road section.

Figure 3:
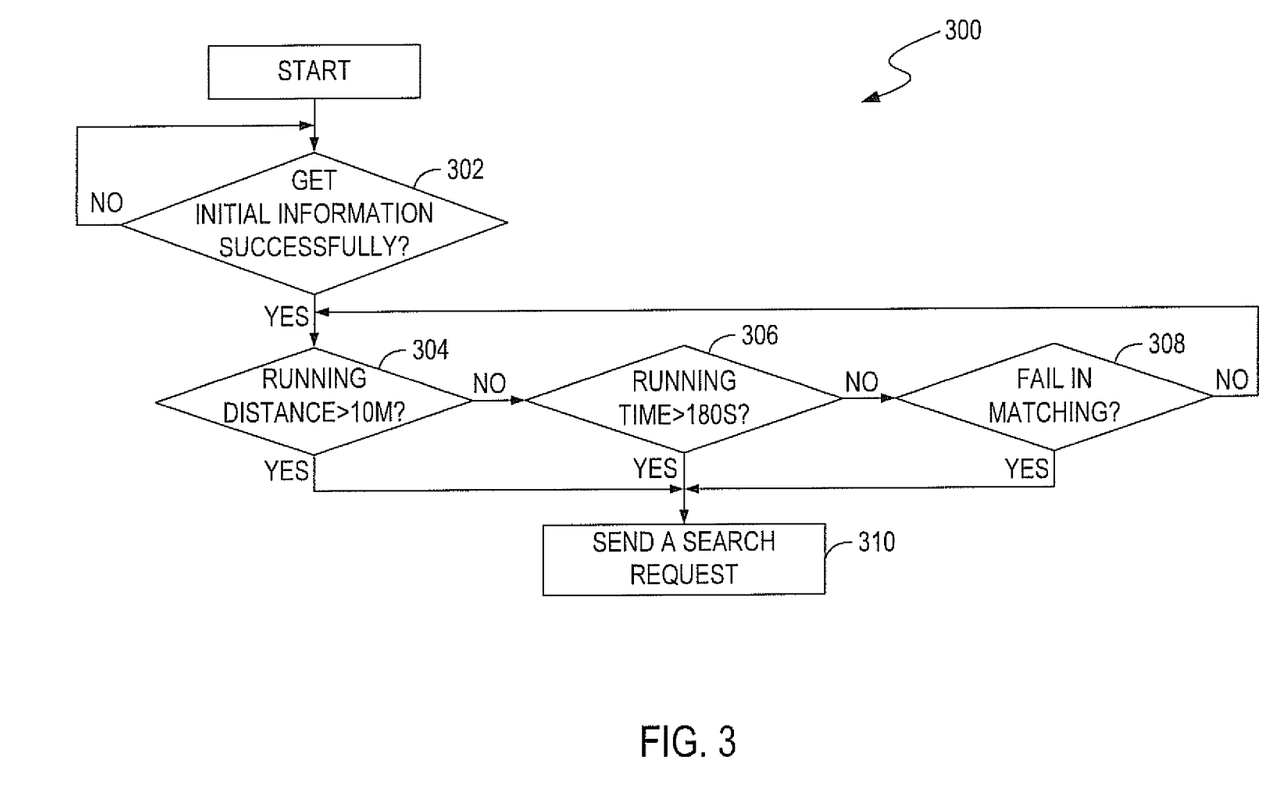
FIG. 3 illustrates a flowchart of examples of operations performed by a positioning system, in accordance with one embodiment of the present invention.

FIG. 3 illustrates a flowchart 300 of examples of operations performed by the position calculation system 112, e.g., by the processor 120, in accordance with one embodiment of the present invention. FIG. 3 is described in combination with FIG. 1. In one embodiment, the processor 120 performs the flowchart 300 to send the map system 102 a request to search for one or more PMR sections (hereinafter, a search request).

At step 302, the processor 120 attempts to get initial information for the moving object. The initial information includes an initial position $P_{INT}$ of the moving object and an initial time $t_{INT}$ corresponding to the initial position $P_{INT}$. The initial information for the moving object can be pre-stored in the DR module 116 or the navigation aid module 114. In one embodiment, when the GPS module 118 receives GPS signals, the GPS module 118 generates position information for the moving object to the processor 120. The processor 120 can use the position information previously generated by the GPS module 118 as the initial position information. The processor 120 can also use position information previously calculated by the DR module 116 as the initial position information. The processor 120 can also uses position information previously corrected by the navigation aid module 114 as the initial position information. When the processor 120 gets initial information for the moving object successfully, the flowchart 300 goes to step 304.

At step 304, the processor 120 compares a running distance of the moving object with a preset reference, e.g., 10 m. The running distance is the distance from the initial position $P_{INT}$ to a currently calculated position $P_{CAL}$. If the running distance $|P_{CAL}-P_{INT}|$ of the moving object is greater than the present distance reference (e.g., 10 m), the processor 120 performs step 310 to send a search request to the map system 102; otherwise, the flowchart 300 goes to step 306.

At step 306, the processor 120 counts the running time of the moving object, measured from the initial time $t_{INT}$ to a current time $t_{CUR}$. If the running time $|t_{CUR}-t_{INT}|$ of the moving object exceeds a preset time reference (e.g., 3 minutes), the processor 120 performs step 310; otherwise, the flowchart 300 goes to step 308.

As mentioned above, the processor 120 can receive reference information e.g., indicative of a reference orientation $O_{REF}$ and a reference position $P_{REF}$, for a reference road section, shown on the navigation map, where the moving object is located. At step 308, the processor 120 compares a currently calculated position $P_{CAL}$ of the moving object with the reference position $P_{REF}$ and compares a currently calculated orientation $O_{CAL}$ of the moving object with the reference orientation $O_{REF}$. For example, the processor 120 compares the distance from the currently calculated position $P_{CAL}$ to the reference position $P_{REF}$ with a predetermined distance threshold, e.g., 10 m. If the distance $|P_{REF}-P_{CAL}|$ is greater than the distance threshold (e.g., 10 m), then the currently calculated position $P_{CAL}$ fails to match with the reference position $P_{REF}$. The processor 120 also compares the difference between the currently calculated orientation $O_{CAL}$ and the reference orientation $O_{REF}$ with a predetermined orientation threshold, e.g., 10°. If the difference $|O_{REF}-O_{CAL}|$ is greater than the orientation threshold, e.g., (10°), then the currently calculated orientation $O_{CAL}$ fails to match with the reference orientation $O_{REF}$. If the currently calculated position $P_{CAL}$ fails to match with the reference position $P_{REF}$ or the currently calculated orientation $O_{CAL}$ fails to match with the reference orientation $O_{REF}$, then the processor 120 performs step 310; otherwise, the processor 120 repeats performing the step 304.

Thus, the processor 120 can send a search request to the map system 102 for various distance thresholds. The processor 120 can also send a search request to the map system 102 at various time intervals. When the calculated information for the moving object fails to match with the reference information, the processor 120 also sends a search request to the map system 102.

Figure 4:
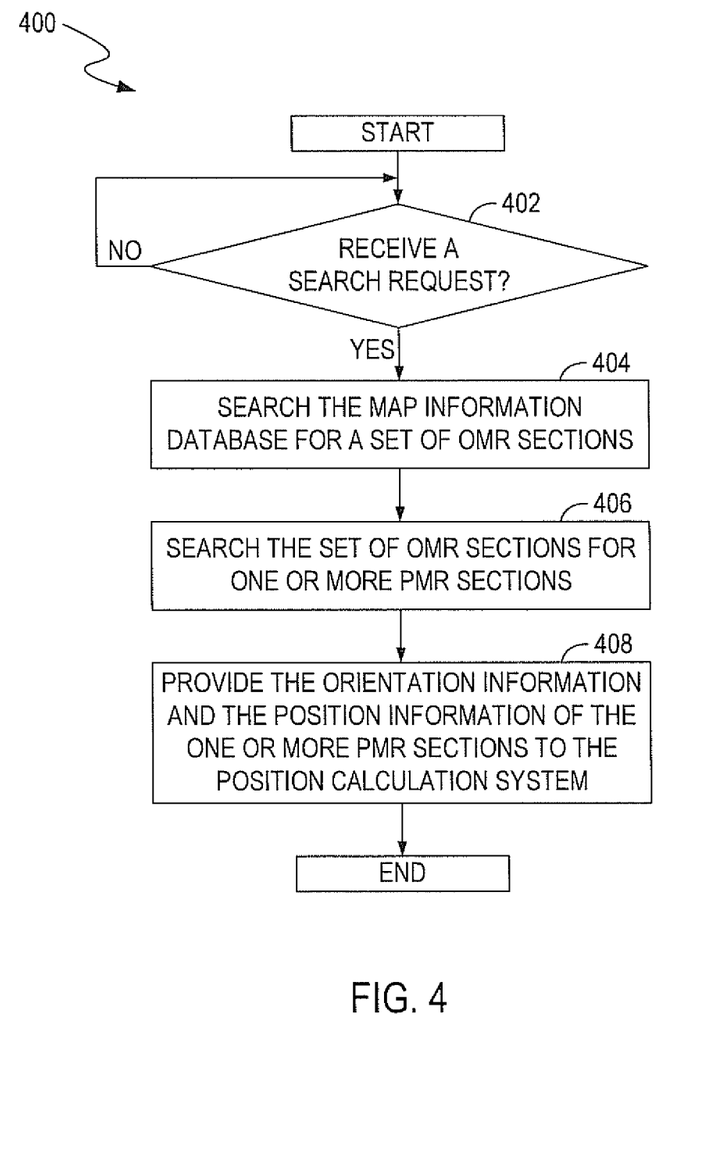
FIG. 4 illustrates a flowchart of examples of operations performed by a positioning system, in accordance with one embodiment of the present invention.

In one embodiment, the map system 102 receives the search request and provides one or more PMR sections to the processor 120 to correct the calculated information for the moving object. FIG. 4 illustrates a flowchart 400 of examples of operations performed by the map system 102, in accordance with one embodiment of the present invention. FIG. 4 is described in combination with FIG. 1 and FIG. 2. In one embodiment, the map system 102 performs the flowchart 400 to provide one or more PMR sections to the processor 120.

At step 402, the map system 102 detects a search request. If the map system 102 receives a search request, the map system 102 performs step 404 to search the database in the map information storage unit 104 for a set of OMR sections. At step 406, the map system 102 searches the OMR sections for one or more PMR sections. If one or more PMR sections are found, then the map system 102 provides the orientation information and the position information for the one or more PMR sections to the position calculation system 112. The map system 102 can perform the search for the OMR sections and the search for the one or more PMR sections in a manner similar to those described in relation to FIG. 1 and FIG. 2.

Figure 5:
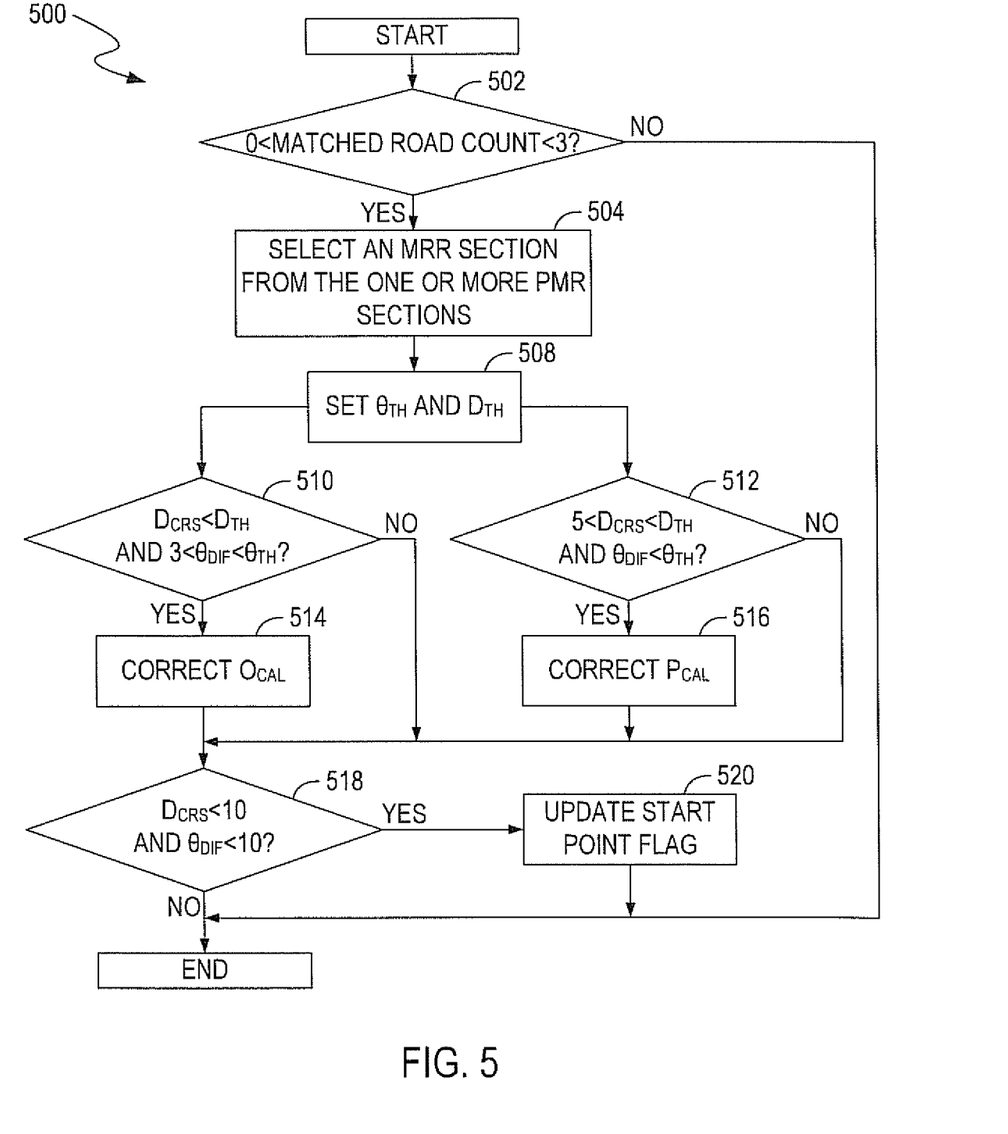
FIG. 5 illustrates a flowchart of examples of operations performed by a positioning system, in accordance with one embodiment of the present invention.

FIG. 5 illustrates a flowchart 500 of examples of operations performed by the position calculation system 112, in accordance with one embodiment of the present invention. FIG. 5 is described in combination with FIG. 1 and FIG. 2. In one embodiment, the position calculation system 112 performs the flowchart 500 to correct a calculated position $P_{CAL}$ of and a calculated orientation $O_{CAL}$ of the moving object.

At step 502, the processor 120 receives information for one or more PMR sections from the map system 102 and checks whether a matched road count, e.g., the number of PMR sections, is greater than zero and less than three. If the matched road count is greater than zero and less than three, the flowchart 500 goes to step 504; otherwise, the flowchart 500 ends.

At step 504, the processor 120 selects an MRR section from the PMR sections. The processor 120 performs the selecting step in a similar manner to that described in relation to FIG. 2.

At step 508, the processor 120 sets an orientation offset threshold $\theta_{TH}$ according to a pattern of change in the calculated orientation $O_{CAL}$ of the moving object, and sets a distance threshold $D_{TH}$ according to a pattern of change in the calculated position $P_{CAL}$ of the moving object. More specifically, if the change in the calculated orientation $O_{CAL}$ in a predefined time interval increases, then the processor 120 increases the orientation offset threshold $\theta_{TH}$. By way of example, in a predefined time interval, if the moving object makes a turn with an angle that is greater than 30° and less than 60°, then the orientation offset threshold $\theta_{TH}$ can be set to 15°. In the predefined time interval, if the moving object makes a turn with an angle that is greater than 60°, then the orientation offset threshold $\theta_{TH}$ can be set to 20°. Additionally, the moving object can run substantially straight on a road, e.g., a turning angle of the moving object within a predefined time interval is less than 20°. If a straight-running distance of the moving object during the time when the moving object runs substantially straight on a road increases, the processor 120 increases the distance threshold $D_{TH}$. By way of example, if the straight-running distance of the moving object is greater than 40 m and less than 150 m, the distance threshold $D_{TH}$ can be set to 50 m. If the straight-running distance of the moving object is greater than 150 m, the distance threshold $D_{TH}$ can be set to 70 m.

In one embodiment, the processor 120 performs steps 510 and 512 in parallel. At step 510, the processor 120 determines whether a distance $D_{CRS}$ from the calculated position $P_{CAL}$ of the moving object to the reference position $P_{REF}$ of the MRR section is within a first distance range, e.g., less the distance threshold $D_{TH}$. At step 510, the processor 120 also determines whether a difference $\theta_{DIF}$ between the calculated orientation $O_{CAL}$ of the moving object and the reference orientation $O_{REF}$ of the MRR section is within a first orientation offset range, e.g., from 3° to the orientation offset threshold $\theta_{TH}$. If the distance $D_{CRS}$ is within the first distance range and the difference $\theta_{DIF}$ is within the first orientation offset range, then the processor 120 performs step 514; otherwise, the processor 120 performs step 518. At step 514, the navigation aid module 114 corrects the calculated orientation $O_{CAL}$ to the reference orientation $O_{REF}$, e.g., by writing information for the reference orientation $O_{REF}$ into the DR module 116 to replace the information for the calculated orientation $O_{CAL}$.

At step 512, the processor 120 determines whether the distance $D_{CRS}$ is within a second distance range, e.g., from 5 m to the distance threshold $D_{TH}$, and whether the difference $\theta_{DIF}$ is within a second orientation offset range, e.g., less than the orientation offset threshold $\theta_{TH}$. If the distance $D_{CRS}$ is within the second distance range and the difference $\theta_{DIF}$ is within the second orientation offset range, then the processor 120 performs step 516; otherwise, the processor 120 performs step 518. At step 516, the navigation aid module 114 corrects the calculated position $P_{CAL}$ to the reference position $P_{REF}$, e.g., by writing the information for the reference position $P_{REF}$ into the DR module 116 to replace the information for the calculated position $P_{CAL}$.

At step 518, the processor 120 determines whether the position and orientation of the moving object currently stored in the DR module 116 is correct. For example, if a distance $D_{CRS}$ between the reference position $P_{REF}$ and the currently stored position of the moving object is less than a predetermined threshold, e.g., 10 m, and a difference $\theta_{DIF}$ between the reference orientation $O_{REF}$ and the currently stored orientation of the moving object is less than a predetermined threshold, e.g., 10°, then the currently stored position and orientation information of the moving object is considered to be correct. If the currently stored information of the moving object is correct, then the flowchart 500 goes to step 520; otherwise, the flowchart 500 ends.

At step 520, the position calculation system 112 updates a start point flag. More specifically, the position calculation system 112 instructs the map system 102 to update the position of the moving object shown on the navigation map according to the information for the moving object currently stored in the DR module 116. The position calculation system 112 can also replace the previously obtained initial information for the moving object with the currently stored information.

Figure 6:
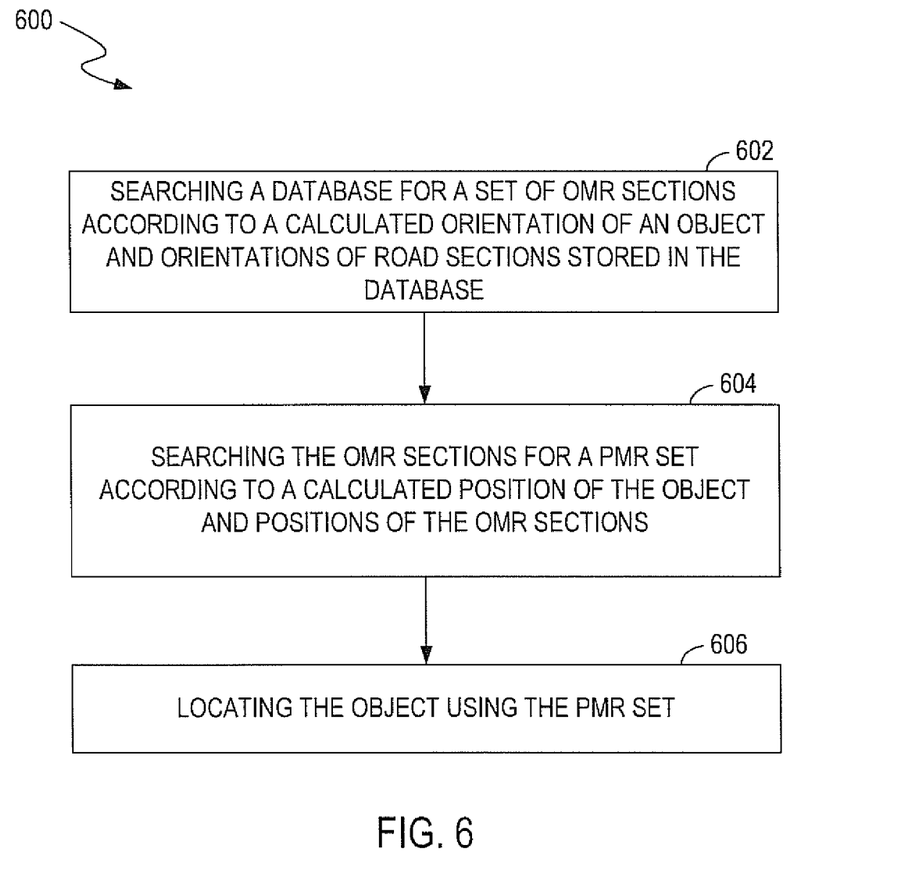
FIG. 6 illustrates a flowchart of examples of operations performed by a positioning system, in accordance with one embodiment of the present invention.

FIG. 6 illustrates a flowchart 600 of examples of operations performed by the positioning system 100, in accordance with one embodiment of the present invention. FIG. 6 is described in combination with FIG. 1, FIG. 2, FIG. 3, FIG. 4 and FIG. 5.

In block 602, the positioning system 100 searches a database in the map information storage unit 104 for a set of OMR sections according to a calculated orientation $O_{CAL}$ of a moving object and orientations $O_{RS}$ of road sections stored in the map information database.

In block 604, the positioning system 100 searches the OMR sections for a PMR set that includes one or more PMR sections according to a calculated position $P_{CAL}$ of the moving object and positions $P_{RS}$ of the OMR sections.

In block 606, the positioning system 100 locates the moving object using the PMR set.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A computer-implemented method for locating an object, said method comprising:
    searching a database for a first plurality of orientation-matched road (OMR) sections according to a calculated orientation of said object and orientations of road sections stored in said database;
    searching said first plurality of OMR sections for a first position-matched road (PMR) set according to a calculated position of said object and positions of said OMR sections, said first PMR set comprising at least one PMR section;
    locating said object using said first PMR set; and
    performing operations if the number of PMR sections in said first PMR set is greater than two, said operations comprising:
        discarding information for said first PMR set;
        searching said database for a second plurality of OMR sections;
        searching said second plurality of OMR sections for a second PMR set; and
        locating said object using said second PMR set.

2. The computer-implemented method as claimed in claim 1, wherein said database comprises information for a navigation map.

3. The computer-implemented method as claimed in claim 1, wherein said searching said database for said first plurality of OMR sections comprises:
    comparing a difference between said calculated orientation of said object and said orientations of said road sections with an orientation offset reference, wherein a difference between said calculated orientation of said object and an orientation of each of said OMR sections is less than said orientation offset reference.

4. The computer-implemented method as claimed in claim 3, wherein said searching said first plurality of OMR sections comprises:
    comparing a distance reference with a distance from said calculated position of said object to each of said OMR sections, wherein a distance from said calculated position of said object to each PMR section in said first PMR set is less than said distance reference.

5. The computer-implemented method as claimed in claim 4, further comprising:
    increasing said distance reference if said searching said first plurality of OMR sections fails.

6. The computer-implemented method as claimed in claim 1, wherein said locating said object comprises:

selecting a matched reference road (MRR) section from said first PMR set according to a distance from said calculated position of said object to each PMR section in said first PMR set.

7. The computer-implemented method as claimed in claim 6, wherein said locating said object further comprises:

correcting said calculated orientation of said object to an orientation of said MRR section if a difference between said calculated orientation of said object and said orientation of said MRR section is within a first orientation offset range and if a distance from said calculated position of said object to said MRR section is within a first distance range; and correcting said calculated position of said object to a position of said MRR section if said difference between said calculated orientation of said object and said orientation of said MRR section is within a second orientation offset range and if said distance from said calculated position of said object to said MRR section is within a second distance range.

8. The computer-implemented method as claimed in claim 7, further comprising:

setting said first and second orientation offset ranges according to a pattern of change in said calculated orientation of said object; and setting said first and second distance ranges according to a pattern of change in said calculated position of said object.

9. The computer-implemented method as claimed in claim 8, wherein said setting said first and second orientation offset ranges comprises:

increasing an orientation offset threshold that defines at least one range of said first and second orientation offset ranges if a change in said calculated orientation of said object in a predefined time interval increases.

10. The computer-implemented method as claimed in claim 8, wherein setting said first and second distance ranges comprises:

increasing a distance threshold that defines at least one range of said first and second distance ranges if a straight-running distance of said object during a time increases.

11. A non-transitory computer-readable storage medium having computer-executable software stored thereon, said software operable for searching a database for a first plurality of orientation-matched road (OMR) sections according to a calculated orientation of an object and orientations of road sections stored in said database, for searching said first plurality of OMR sections for a first position-matched road (PMR) set according to a calculated position of said object and positions of said first plurality of OMR sections, for locating said object using said first PMR set, and for discarding information for said first PMR set, searching said database for a second plurality of OMR sections, searching said second plurality of OMR sections for a second PMR set, and locating said object using said second PMR set, if the number of PMR sections in said first PMR set is greater than two, wherein said first PMR set comprises at least one PMR section.

12. The computer-readable storage medium as claimed in claim 11, wherein said software searches for said first plurality of OMR sections by comparing a difference between said calculated orientation of said object and said orientations of said road sections with an orientation offset reference, and wherein a difference between said calculated orientation of said object and an orientation of each of said OMR sections is less than said orientation offset reference.

13. The computer-readable storage medium as claimed in claim 12, wherein said software searches for said first PMR set by comparing a distance reference with a distance from said calculated position of said object to each of said OMR sections, and wherein a distance from said calculated position of said object to each PMR section in said first PMR set is less than said distance reference.

14. The computer-readable storage medium as claimed in claim 13, wherein said software increases said distance reference if said searching said first plurality of OMR sections fails.

15. An electronic system associated with locating an object, said electronic system comprising:

a processing unit; and memory coupled to said processing unit, said memory comprising computer-readable instructions that, when executed by said processing unit, cause said electronic system to search a database for a first plurality of orientation-matched road (OMR) sections according to a calculated orientation of said object and orientations of road sections stored in said database, to search said first plurality of OMR sections for a first position-matched road (PMR) set according to a calculated position of said object and positions of said first plurality of OMR sections, to locate said object using said first PMR set, and to discard information for said first PMR set, search said database for a second plurality of OMR sections, search said second plurality of OMR sections for a second PMR set, and locate said object using said second PMR set, if the number of PMR sections in said first PMR set is greater than two, wherein said first PMR set comprises at least one PMR section.

16. The electronic system as claimed in claim 15, wherein said database comprises information for a navigation map.

17. An electronic system for locating an object, said electronic system comprising:

an interface operable for receiving information for a first position-matched road (PMR) set comprising at least one PMR section; and a processor coupled to said interface and operable for providing information indicative of a location of said object according to said first PMR set, wherein said first PMR set is obtained by searching a database for a first plurality of orientation-matched road (OMR) sections according to a calculated orientation of said object and orientations of road sections stored in said database, and by searching said first plurality of OMR sections for said first PMR set according to a calculated position of said object and positions of said first plurality of OMR sections, and wherein if the number of PMR sections in said first PMR set is greater than two, said processor discards said information for said first PMR set, generates a request of searching said database for a second plurality of OMR sections and searching said second plurality of OMR sections for a second PMR set, and provides information indicative of said location of said object according to said second PMR set.

18. The electronic system as claimed in claim 17, wherein said first plurality of OMR sections are obtained by comparing a difference between said calculated orientation of said object and said orientations of said road sections with an orientation offset reference, and wherein a difference between said calculated orientation of said object and an orientation of each of said first plurality of OMR sections is less than said orientation offset reference.

19. The electronic system as claimed in claim 18, wherein said first PMR set is obtained by comparing a distance reference with a distance from said calculated position of said object to each of said first plurality of OMR sections, and wherein a distance from said calculated position of said object to each PMR section in said first PMR set is less than said distance reference.

20. The electronic system as claimed in claim 17, wherein said processor selects a matched reference road (MRR) section from said first PMR set according to a distance from said calculated position of said object to each PMR section in said first PMR set.

21. The electronic system method as claimed in claim 20, wherein said processor corrects said calculated orientation of said object to an orientation of said MRR section if a difference between said calculated orientation of said object and said orientation of said MRR section is within a first orientation offset range and if a distance from said calculated position of said object to said MRR section is within a first distance range, and wherein said processor corrects said calculated position of said object to a position of said MRR section if said difference between said calculated orientation of said object and said orientation of said MRR section is within a second orientation offset range and if said distance from said calculated position of said object to said MRR section is within a second distance range.

22. The electronic system as claimed in claim 21, wherein said processor is operable for setting said first and second orientation offset ranges according to change in said calculated orientation of said object and operable for setting said first and second distance ranges according to change in said calculated position of said object.

\* \* \* \* \*